United States Patent
Arnaud et al.

(10) Patent No.: US 6,895,291 B2
(45) Date of Patent: May 17, 2005

(54) PROCESS FOR STRUCTURING AND MANAGING THE CONFIGURATION OF INDUSTRIAL PRODUCTS, AND PARTICULARLY AIRCRAFT

(75) Inventors: Françoise Arnaud, Castanet Tolosan (FR); Antoine Scotto D'Appolonia, Blaonal (FR)

(73) Assignee: Airbus Industrie, Blagnac (FR)

( * ) Notice: Subject to any disclaimer, the term of this patent is extended or adjusted under 35 U.S.C. 154(b) by 208 days.

(21) Appl. No.: 10/189,260

(22) Filed: Jul. 3, 2002

(65) Prior Publication Data
US 2003/0024304 A1 Feb. 6, 2003

(30) Foreign Application Priority Data
Jul. 5, 2001 (FR) ............................................ 01 08932

(51) Int. Cl.[7] .............................................. G06F 19/00
(52) U.S. Cl. ............................ 700/97; 700/104; 705/27
(58) Field of Search .......................... 700/97–100, 104, 700/108, 107; 705/29, 27, 28; 707/104.1

(56) References Cited

U.S. PATENT DOCUMENTS

| | | | |
|---|---|---|---|
| 5,117,354 A | | 5/1992 | Long et al. .................... 705/27 |
| 5,260,866 A | * | 11/1993 | Lisinski et al. ............... 705/29 |
| 5,552,995 A | | 9/1996 | Sebastian ...................... 700/97 |
| 5,576,965 A | * | 11/1996 | Akasaka et al. ............... 700/97 |
| 5,862,050 A | * | 1/1999 | Toyota ......................... 700/97 |
| 6,035,305 A | * | 3/2000 | Strevey et al. ............ 707/104.1 |

FOREIGN PATENT DOCUMENTS

| | | | |
|---|---|---|---|
| EP | 0 899 672 A2 | 8/1998 | ........... G06F/17/60 |
| WO | 00/36544 | 6/2000 | ........... G06F/19/60 |
| WO | 00/49544 | 8/2000 | ........... G06F/17/60 |

* cited by examiner

*Primary Examiner*—Kidest Bahta
(74) *Attorney, Agent, or Firm*—Oblon, Spivak, McClelland, Maier & Neustadt, P.C.

(57) ABSTRACT

A process to structure and manage the configuration of an industrial product, taking into account selected options includes describing a set of technical objects, each technical object either representing a product function or describing an implementation method for making a product configuration for such a product function. The technical objects represent manufacturing options of the industrial product. The process further includes updating a database to clarify a definition of each technical object and its inter-relations with other objects in the configuration. The definition includes an expression of rules and constraints. The process also includes interacting with the database during the product configuration, through a selection of options, wherein the interacting includes using a knowledge management module, a contract management module, an administration module, and a mass management module.

11 Claims, 2 Drawing Sheets

PROCESS FOR STRUCTURING AND MANAGING THE CONFIGURATION OF INDUSTRIAL PRODUCTS, AND PARTICULARLY AIRCRAFT

This application claims priority based on FRENCH application Serial No. No 01 08932, entitled "PROCESS FOR STRUCTURING AND MANAGING THE CONFIGURATION OF INDUSTRIAL PRODUCTS, AND PARTICULARLY AIRCRAFT" by ARNAUD, Francoise and SCOTTO D'APPOLONIA Antoine filed on Jul. 5, 2001.

DESCRIPTION

Technical Domain

This invention relates to a process for structuring and managing the configuration of industrial products, and particularly aircraft.

State of the Art

A patent application according to known art, EP-0 899 672, discloses a computer-aided process for structuring data concerning the configuration of products, for example aircraft, and to configure these products. This process is used to collect, structure and display this type of data and to use them to produce a computer program that validates product option selections and configures such a product. When product data objects are selected, an operator is invited to enter the specific data belonging to the selected object. Constraints limit selections that the operator can make, the appearance of these objects, and configurations that may be produced from the selected objects. Data belonging to the selected objects and their configurations are stored in a database. Changes may be made directly in the data stored in the database, and these changes are reproduced in a corresponding display. After production of a knowledge map that graphically displays the data necessary to configure the product, the data are retrieved from this database to produce a set of rules that are entered into the program to validate a set of product option selections and to configure a final product defined by the resulting modules.

This process is a graphic structuring, input, data storage and management process to configure a product, taking account of options selected by a customer. But it does not disclose interactive and dynamic use of these data during the exercise to define the product with a customer.

The purpose of the invention is to overcome this disadvantage and to provide a process for structuring and managing the complete process to configure an industrial product, and particularly an aircraft for example such as an Airbus type as it is sold to customers, and in this case to trigger the process for construction of this aircraft in the assembly lines.

Presentation of the Invention

This invention relates to a process for structuring and managing the configuration of an industrial product and particularly an aircraft, using processing means comprising at least one processor, a memory, data input means and a display screen, in which:

a set of technical objects is described, each technical object either representing a product function (EPAC), or describing an implementation method (TDU) for such a product function to make a configuration of this product;

a database is updated to specify the definition of each technical object and its inter-relations with other objects of the configuration by an expression of rules and constraints;

this database is used interactively and dynamically through a choice of options;

this database is used interactively and dynamically during the product definition made with this customer, through a selection of options.

It is advantageous to use:

a knowledge management module, a contract management module, an administration module, a mass management module, a tariff management module, all working on the database.

Advantageously, in one functional approach, the aircraft is considered as a set of functions.

The contract management module may operate in connected or disconnected mode.

It is possible to use:

an EPAC/TDU oriented configuration in which the options (EPAC) and the corresponding technical solutions (TDU) are chosen directly in a list sorted by ATA chapter, job category and sales policy, this selection being made either individually or globally due to a global procedure used to attach a possible aircraft application, a weight and a price to a set of options in the same functional domain, or a functional oriented configuration that provides a functional approach used to directly select EPAC/TDU technical objects specifying the required properties of a functional characteristic.

The contract manager can initiate a configuration checking process at any time.

Unlike patent application EP-0 899 672 mentioned above that emphasizes modeling of technical objects and the description of their inter-relations in a constraints graph, but which leaves little opportunity for the use of this graph during the definition of the said objects with customers, the process according to the invention uses the opposite approach and makes use of:

simple modeling of rules and constraints in the database;

interactive and dynamic use ("Front Office Application") of these constraints during the definition of the industrial product.

Furthermore, the process according to the invention does not use any graphic representation or management.

DETAILED PRESENTATION OF PARTICULAR EMBODIMENTS

Figure 1:
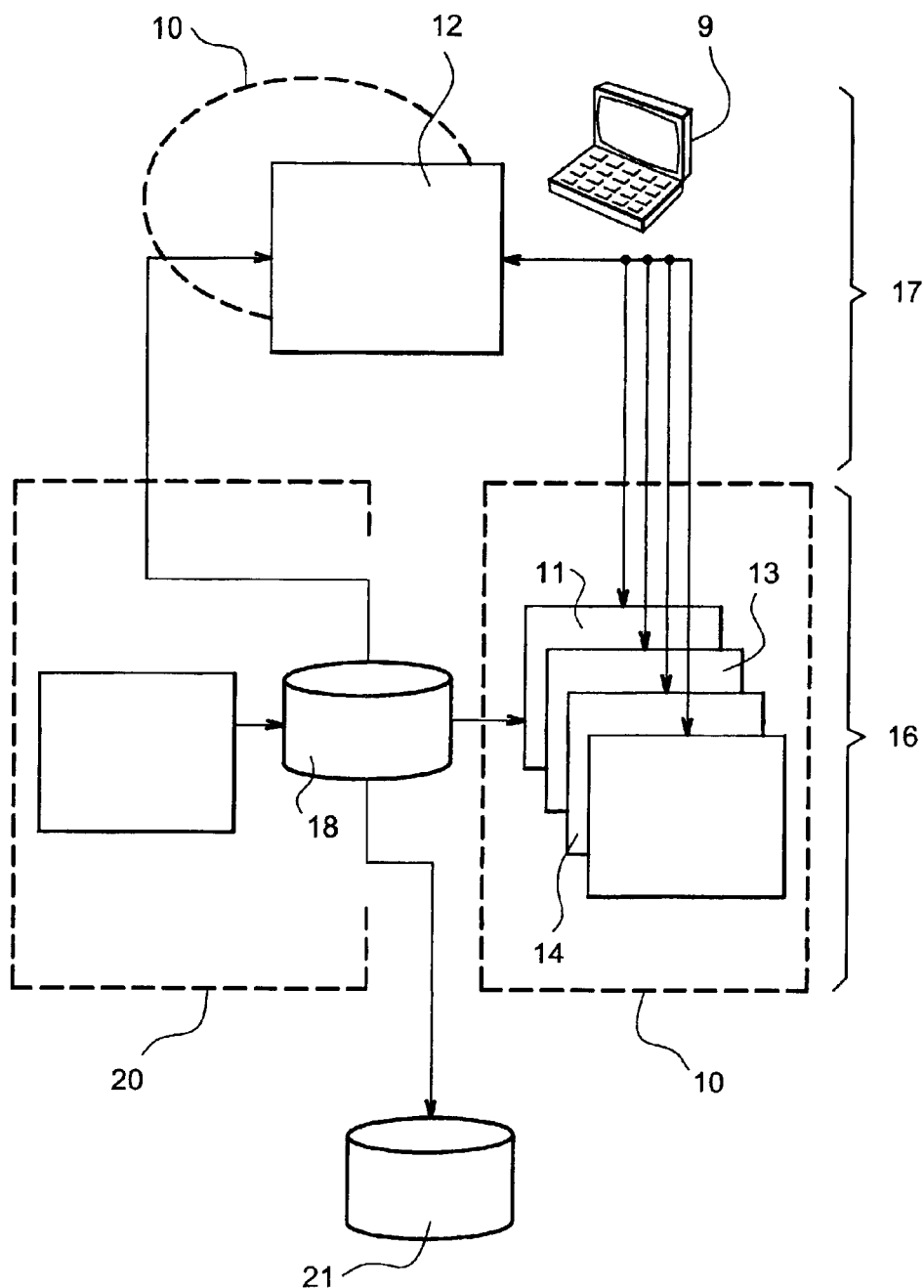
FIG. 1 illustrates the different modules used in the process according to the invention.

The case of the Airbus type aircraft configuration is considered as an example throughout the remainder of this description, however the configuration of any other industrial product would be quite possible, for example helicopters, automobiles, etc.

This invention relates to a process for structuring and managing the configuration of an aircraft using a computer 9 that in particular includes a processor, a memory, data input means, for example a keyboard and a mouse, and a display screen, in which a set of technical objects is described, each technical object either representing a function of the aircraft (EPAC), or describing an implementation method (TDU) for such an aircraft function to create an aircraft configuration, these objects representing implementation options for this aircraft proposed to a customer;

a known database is updated to clarify the definition of each technical object, and its inter-relations with the other objects in the configuration by an expression of rules and constraints;

this database is used interactively and dynamically during the definition of this aircraft carried out with this customer through a choice of options.

More precisely, this process uses five modules, for which the state may be illustrated on the display screen and modified using input means:

a knowledge management module (11) ("Back Office Module", the "Back Office" being technical documentation and validation work that is done in close cooperation with design offices and program managers), which is dedicated to the management of all Airbus entities including documentation generation, in other words the standard specification and catalogues. For example, these entities are EPAC technical objects each representing an aircraft function, some of these functions being compulsory (for example the motor drive), TDU technical objects each describing a solution to implement an EPAC technical object (several TDU technical solutions may be proposed for one EPAC function), the definition of standard characteristics, the catalogue definition, etc.

a contract management module 12 ("Front Office Module", the "Front Office" being use of the work done by the "Back Office" for technical-sales engineers working with the customer) that is dedicated to the management of fleet configurations including the generation of contract documentation;

an administration module 13 that is dedicated to the management of user profiles, either in "Back Office" or in "Front Office" a mass management module 14, either in the "Back Office" or the "Front Office".

In FIG. 1, the "Back Office" and "Front Office" parts are marked with references 16 and 17 respectively.

These five modules work on the same database 18. The system using the process according to the invention has interfaces with other data systems belonging to the Airbus company; for example with the cabin layout configuration system 20 as shown in FIG. 1, with product management and the ACC ("Aircraft Configuration Control") system for communication with partners of the Airbus company. The ACC system is a computer tool used to manage the industrial configuration of all aircraft and to launch the necessary work orders.

The database 18 is used to update the ACC databases 21 shared particularly between the Airbus company and its partners in order to manage production orders.

Statistics may be extracted from the database 18 to supply data about the use of TDU technical objects, the definition of the aircraft of a customer, or the internal operating efficiency of the Airbus company.

The Knowledge Management Module 11 (in "Back Office")

This module 11 is intended to satisfy the needs of catalogue specialists and engineers. This module is used to create and update solutions defining entities proposed by the Airbus company to its customers, and to produce a technical aircraft documentation (standard characteristics and option catalogues).

The technical solutions proposed by the Airbus company are debugged according to the breakdown into EPAC/TDU. The first two digits of the EPAC technical object correspond to the ATA result; ATA is an internationally recognized breakdown of the functions of an aircraft.

This knowledge management module 11 manages the creation and updating of all EPAC and TDU technical objects.

The description of a TDU technical object includes:

an equipment breakdown, a text, and drawings.

Further data are related to the TDU technical object, such as the impact of the weight on the aircraft or the price.

The process related to a TDU technical object can be used to memorize a policy, which is a means of classifying the TDU technical object as a function of the sales policy decided upon by the Airbus company.

In liaison with an EPAC technical object, the process according to the invention is used to memorize a job category. This job category is used to sort the different EPAC technical objects and it may be used to filter EPAC technical objects that can be used by a particular User: for example, cabin engineers work mainly on cabin elements.

All these data are used and compiled during generation of the technical documentation.

Logical relations are used between EPAC technical objects and/or between TDU technical objects. These relations actually express all the knowledge of specialists and are available to contract managers. They enable an expression of the links between different options in terms of incompatibility or prior acceptance. The introduction of this type of constraint guarantees the consistency and the complete nature of the future configuration.

These constraints may be applied in two different ways:

a "hard" manner; the constraints are automatically applied by the contract management module 12 without any action by the user;

a "soft" manner: the user is informed by the contract management module 12 that there is a constraint, but the user can avoid it.

Each specialist can define the following in relation to a constraint:

an explanation, a warning.

The process according to the invention proposes a functional approach, in addition to a conventional approach consisting of browsing through an ATA decomposition.

This functional approach is a means of considering an aircraft as a set of functions and no longer as a set of EPAC/TDU technical objects. This enables a much more efficient aircraft design; with this type of decomposition, the process according to the invention can be used to configure an aircraft by specifying the required aircraft functions rather than by selecting individual TDU technical objects.

These two approaches are possible simultaneously with the process according to the invention; it is thus possible to configure an aircraft either using the functional approach or the conventional approach. However, since aircraft functions are used by TDU technical objects, in each approach the result of a configuration remains a set of TDU technical objects.

The technical documentation considered here includes a specification, in other words an understandable description of a standard aircraft, and the catalogue of options (optional TDU technical objects that may be used to customize a standard aircraft).

The process according to the invention makes it easy to view (use data) the different decompositions, in order to facilitate the user's work. Data access is simplified because the user can take advantage of synthetic and graphic views of the data hierarchy. Similarly, it is possible to work on a large set of data simultaneously rather than on a single item of data at a time.

The specialist is responsible for determining if the delivered product is correct, before issuing a standard specification or a catalogue. Test tools are used to check consistency.

The ACC application is the current tool used by the Airbus company to exchange data with its partners, and to synchronize the aircraft construction process in assembly lines, therefore "Back Office" outputs such as the creation of EPAC and TDU technical objects and management of specific requests are input into the ACC database 21.

The Contract Management Module 12 (in "Front Office")

This module 12 is intended to satisfy the requirements of contract managers, cabin engineers and IFE ("In Flight Entertainment") engineers, IFE including audio/video means available in the cabin of an aircraft.

These users use this module 12 to define the configuration of the aircraft that forms part of the fleet defined by the Airbus company. This configuration is made up of functions and technical solutions defined by the Design Office and selected by the customer. Once the configuration has been fixed, the customer is provided with contract documentation.

Since a fleet may be configured taking account of the customer's wishes and during several configuration sessions, this contract management module 12 is designed to work either in connected mode (to the Airbus company) or in disconnected mode (using a portable). Server synchronization functions are used to manage "upload" or "download" procedures necessary to synchronize resident and portable databases. This module 12 is used for configuration management in the presence of the customer.

In the configuration exercise, that consists of configuring a fleet in accordance with the customer's wishes, wherever possible based on options proposed by the Airbus company, the contract manager must firstly select the fleet to be configured, and revise the standard specification that will determine the catalogue revisions available to customize the aircraft.

The contract manager can also display different data about the fleet including the number of aircraft, delivery dates, certification capacities, etc.

This module can be used to configure two types of fleets:
a normal fleet,
a fleet in "leasing".

In some cases, the contract manager may prepare the configuration of a fleet before it is created in the ACC base. To work by anticipation, he then uses the concept of the preliminary design in order to create a standard configuration based on a standard specification revision and not related to a fleet. This concept may also be used to study alternative solutions for a fleet configuration.

Once these data have been defined, the contract manager can start the configuration exercise that consists of selecting the customer's needs. There are two ways of managing the aircraft configuration:

an EPAC/TDU oriented configuration in which the options (EPAC) and the corresponding technical solutions (TDU) are selected directly in a list sorted by ATA chapter, job category and sales policy. This selection may be made either individually or globally using a global procedure to attach a possible aircraft application and a mass to a set of options in the same functional domain. The global procedure is managed through the global configuration concept ("packages").

a functional oriented configuration that provides a functional approach in order to directly select EPAC/TDU technical objects by specifying the required properties of a functional characteristic. This type of configuration is available only for some complex subjects and provides more significant data. But this type of option selection also leads to EPAC/TDU technical objects.

Logical constraints used between EPAC technical objects and/or TDU technical objects express all the specialist's—knowledge, and are available for use by the contract manager. This knowledge is used through the configuration process, to help contract managers during the aircraft definition step while avoiding errors and guiding the configuration.

At the time of an aircraft configuration, the Airbus company may encounter a specific need formulated by the customer for which there is no EPAC/TDU technical object. In this case, the contract manager asks the design office and the partners to study and possibly propose a new solution. This specific request is processed through a specific process, and the TDU technical objects are sent to it as a reply; if a new TDU technical object is created specifically for the said request, this new TDU technical object is used to input data to the system.

For some selected options, the contract manager can configure the aircraft properties in order to satisfy the customer's needs. These properties are defined by the "Back Office" and are identified as being configurable.

The contract manager can also set parameters for the selected options in order to satisfy the customer's needs; change the quantities of elements in the TDU technical object, give detailed specifications for an elements family, to change the BFE/SFE status which represents the equipment procurement mode; BFE ("Buyer Furnished Equipment") being equipment supplied by the customer and SFE ("Seller Furnished Equipment") being equipment supplied by the Airbus company. All these modifications are taken into account at the time when the contract documentation is generated. The text description of the TDU technical object (change consequence, impacts of specification, etc) cannot be changed. However, the contract manager can modify the final contract document once it has been generated.

When the EPAC/TDU simple or global configuration or the functional configuration is used, all logical constraints defined in the "Back Office" are checked dynamically. The contract manager is then informed about each inconsistent selection in order to finally obtain a consistent and complete fleet configuration. The logical rules used may be incompatibility or prior acceptance.

When an individual option is being selected, the contract manager can specify that this option should be installed in "retrofit", in other words off the production line after the aircraft has been delivered.

Cabin features and IFE specific features are used to take account of specific features in the process for configuration of these functional domains.

The contract manager can start a configuration checking process at any time during the configuration exercise, to perform a complementary check to ensure that the fleet configuration is complete. For example, he can check that at least one TDU technical object has been selected for all compulsory EPAC technical objects, or obtain a summary of all software constraints that have been violated during the configuration.

During the configuration exercise the contract manager can use a standard catalogue and specification viewer at any time to view the contents of electronic catalogues or standard "in line" specifications corresponding to versions of the options catalogue or the standard specifications of the Airbus company. In this way, he can access a complete technical description of options supplied by the Airbus company; text and graphic descriptions, mass information and the component number are thus all available.

The exercise to make a detailed definition of an aircraft may require several work sessions and a contract may be effective over several years. Changes which have an impact on the customized fleet (movement of an aircraft from one fleet to another, addition or deletion of aircraft in a fleet), etc. may take place during this period of time and thus make the contents of the contract documentation supplied to the customer obsolete. Change management functions are used to detect these changes and inform the contract manager to help him make the right decisions.

The contract management module 12 is interfaced with the system to define the interior of the cabin 20 which may initially be used to attach the reference of the drawing of the cabin interior to an aircraft or a set of aircraft in a fleet, and secondly to retrieve all elements selected in the cabin, in this module 12. This avoids multiple inputs of the same data, and thus guarantees good consistency.

When a customer selects an option, the contract manager may supply these data to partners of the Airbus company by activating the interface to the ACC (industrial aircraft configuration management system). This interface is used to use "Front Office" outputs such as EPAC, TDU technical objects and configuration selections as input to the ACC database 21.

The Administration Module 13

This module 13 is dedicated to the management of user profiles. Several categories of specialists, each with their own specific competence, are involved:

in the aircraft definition process, these specialists may for example be contract managers, cabin engineers, IFE engineers, mass specialists;

in the aircraft design process, these specialists may for example be technical specialists, mass specialists and catalogue author specialists.

Since access to functions and data is strongly dependent on the user profile, this administration module 13 is used to manipulate profile management.

The Mass Management Module 14

Masses are managed by a specific module 14 that uses all data supplied by the contract management module to calculate the mass of the customized configuration produced by the contract manager.

Example Use of the Process According to the Invention

Figure 2:
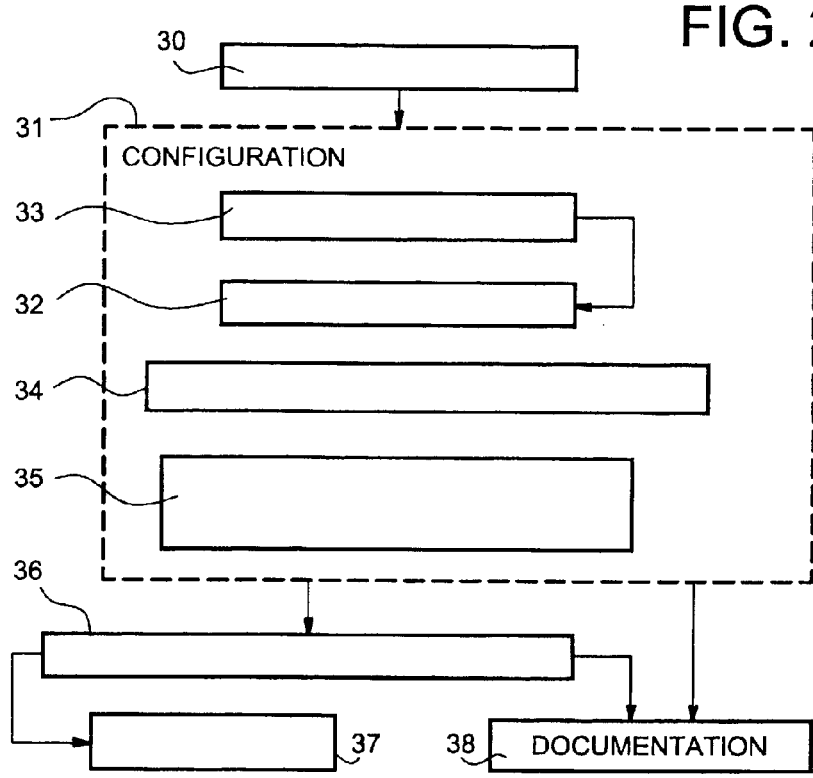
FIG. 2 illustrates an example embodiment of the process according to the invention.

FIG. 2 shows such an example of use of the process according to the invention. Starting from an open fleet 30, and the configuration 31 of an aircraft is made by making EPAC/TDU selections 32 by using specific requests to trace additional requests of the customer 33, doing a global configuration of the cabin and the IFE 34 and by setting parameters for TDU objects 35. This is followed by an ACC communication 36 with officialization of the contract definition and production of documentation 38.

These different phases will be analyzed below.

Selection (32) of EPAC/TDU Technical Objects

The following steps take place during this phase:

the original configuration screen displays all available EPAC technical objects proposed for the fleet considered by the ATA breakdown;

an EPAC technical object (function) is selected followed by a TDU technical object (to indicate the selected solution);

each TDU technical object has a status in the fleet:
"available" to stop the selection of a previously selected TDU technical object;
"selected" to select a TDU technical object for the fleet considered, and define a possible aircraft application;
all these selections are made official through customer Requests for change transmitted in ACC.

The above selections may be made with a graphic interface ("click, drag and drop" type actions carried out using a mouse).

It is possible to use a filter to restrict the display to technical objects that have already been decided upon for the fleet.

It is possible to use an aircraft view and select an aircraft in a list of aircraft so that only options for this aircraft can be seen.

Different icons illustrated in the selection screens for EPAC/TDU technical objects, are used to make validations like those described above, and to determine logical incompatibilities; for example for an EPAC/TDU technical object for one or several aircraft in the fleet.

Different types of constraints may apply to EPAC/TDU technical objects prior acceptance: an EPAC or a TDU may require prior acceptance of another EPAC or TDU an incompatibility: an EPAC or a TDU may be incompatible with another EPAC or TDU;

these two types of constraints may be expressed in a "compulsory" or "informative" manner. If a constraint is compulsory, the related technical object will be selected automatically. If it is optional, a warning is issued about the constraint and the user is requested to confirm his decision.

Exclusive TDUs; an EPAC may comprise an "exclusive TDU" item of data input into the "Back Office" that prevents two TDUs from this EPAC being selected for the same aircraft.

Specified Request (33)

This type of request is used when no TDU technical object can be found to satisfy a definition need.

Figure 3:
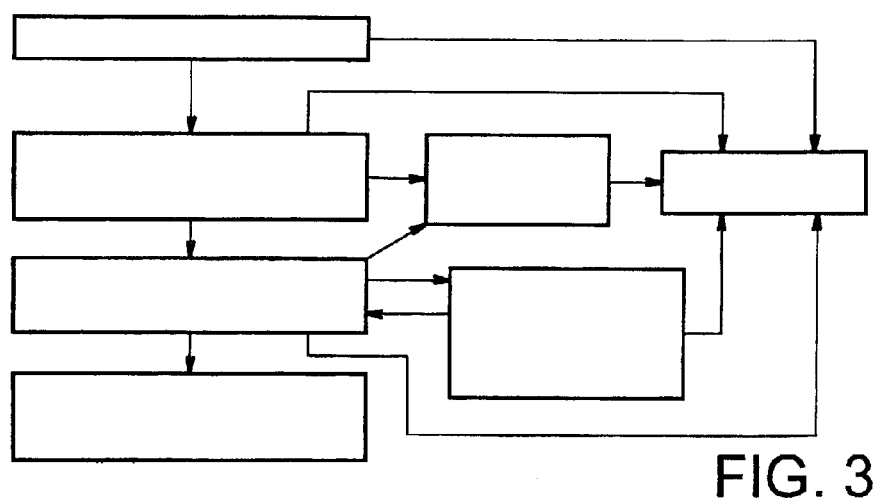
FIG. 3 illustrates the operating steps of a specific patent application according to the invention.

The diagram shown in FIG. 3 shows the different steps in such a request, that begins when it is created by the "Front Office" user.

Global Configuration Procedure (CABIN, IFE, etc.) (34)

This phase includes the following steps:

for a new configuration, the job category concerned is selected;

an existing global configuration can then be modified;

the requested TDU technical objects are selected;

this selection is validated;

applicability for the global configuration created on one or several aircraft in the fleet can be expressed.

The customer request is then made official in ACC.

Setting TDU Parameters

Parameters may be set for the following elements:

the state and the quantity, as a function of data indicated in "Back Office";

the seller, or the seller and the part identification, if they are not specified in the TDU "Back Office" technical object;

the properties, that consist of complementary data and are compulsory wherever they are applicable.

Setting Parameters for Global Configurations (35) In this phase:

TDU technical objects for the global configuration can be set in the same way as individual TDUs;

some complementary details are necessary to make the request official; the reference number of the cabin layout drawing, cabin parameters.

ACC Communication (36)

All selected TDU technical objects can be displayed for all ATAs, or one selected ATA, and the corresponding states and numbers can be displayed for the generated customer requests.

Different icons may be seen in the ACC interface screen indicating the following in particular applicability on fleet aircraft;

the TDU was updated and validated in the "Back Office" after its last selection;

an official contract document has already been generated for the TDU, or global configuration;

the officialization state of the customer's request: refused, accepted, being processed.

Officialization (37)

This is a means of making the customer's acceptance or rejection of an option (EPAC, TDU) official for the industrial world.

Documentation (38)

This operation is used to create an SCN document based on a "Front Office" TDU technical object ("TDU "Back Office"+ individualization);

document modification if necessary;

print the document if requested;

save the document and its officialization state.

A viewer may be used to display the recorded documents.

What is claimed is:

1. Process to structure and manage the configuration of an industrial product, taking into account selected options said process comprising:

describing a set of technical objects, each technical object either representing a product function, or describing an implementation method for making a product configuration for such a product function, said technical objects representing manufacturing options of the industrial product;

updating a database to clarify a definition of each technical object and its inter-relations with other objects in the configuration, said definition comprising an expression of rules and constraints;

interacting with said database during the product configuration, through a selection of options, wherein said interacting comprises using:

a knowledge management module, a contract management module, an administration module, and a mass management module.

2. Process according to claim 1, in which the industrial product is considered as a set of functions in a functional approach.

3. Process according to claim 1, in which the contract management module works in a connected or disconnected mode.

4. Process according to claim 1, in which a technical oriented configuration is used in which the options and the corresponding technical solutions are selected directly in a list sort by ATA chapter, job category or sales policy, this selection being made either individually or globally using a global procedure that joins a possible application and a weight to a set of options in the same functional domain.

5. Process according to claim 1, in which a functional oriented configuration is used that supplies a functional approach to directly select technical objects, specifying the required properties of a functional characteristic.

6. Process according to claim 1, in which the a contract manager may start a configuration checking process at any time.

7. Process according to claim 1, in which the industrial product is an aircraft.

8. Process according to claim 1, wherein the knowledge management module is configured to manage technical objects each representing an aircraft function.

9. Process according to claim 1, wherein the contract management module is configured to manage fleet configurations of aircraft.

10. Process according to claim 1, wherein the administration module is configured to manage user profiles.

11. Process according to claim 1, wherein the mass management module is configured to manage mass of a customized configuration from data supplied from the contract management module.

* * * * *